Figure 1:
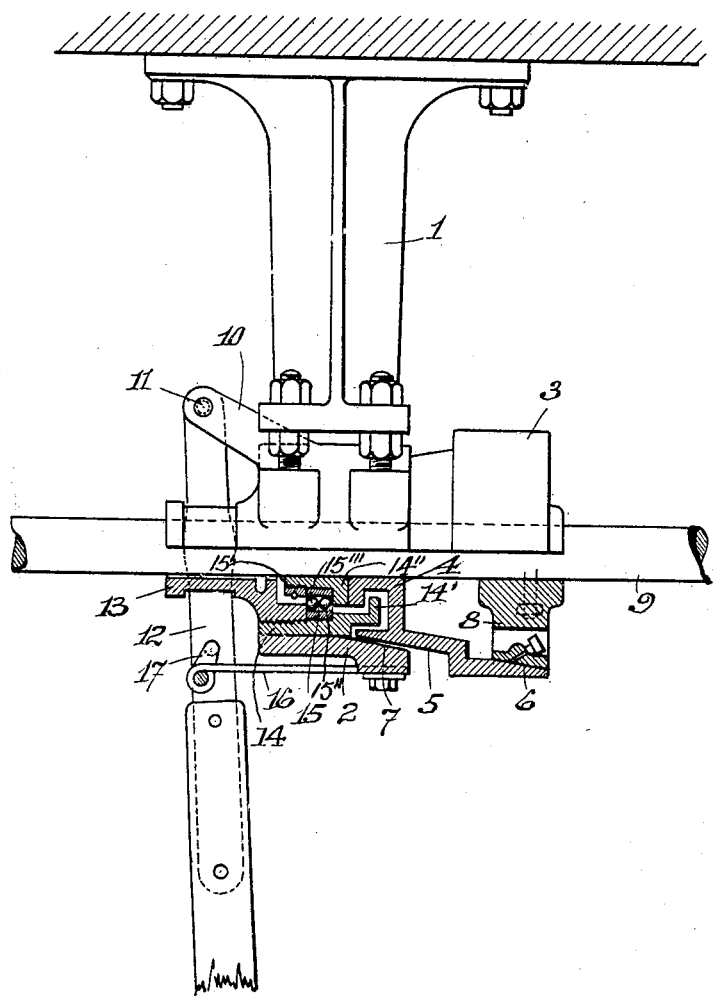

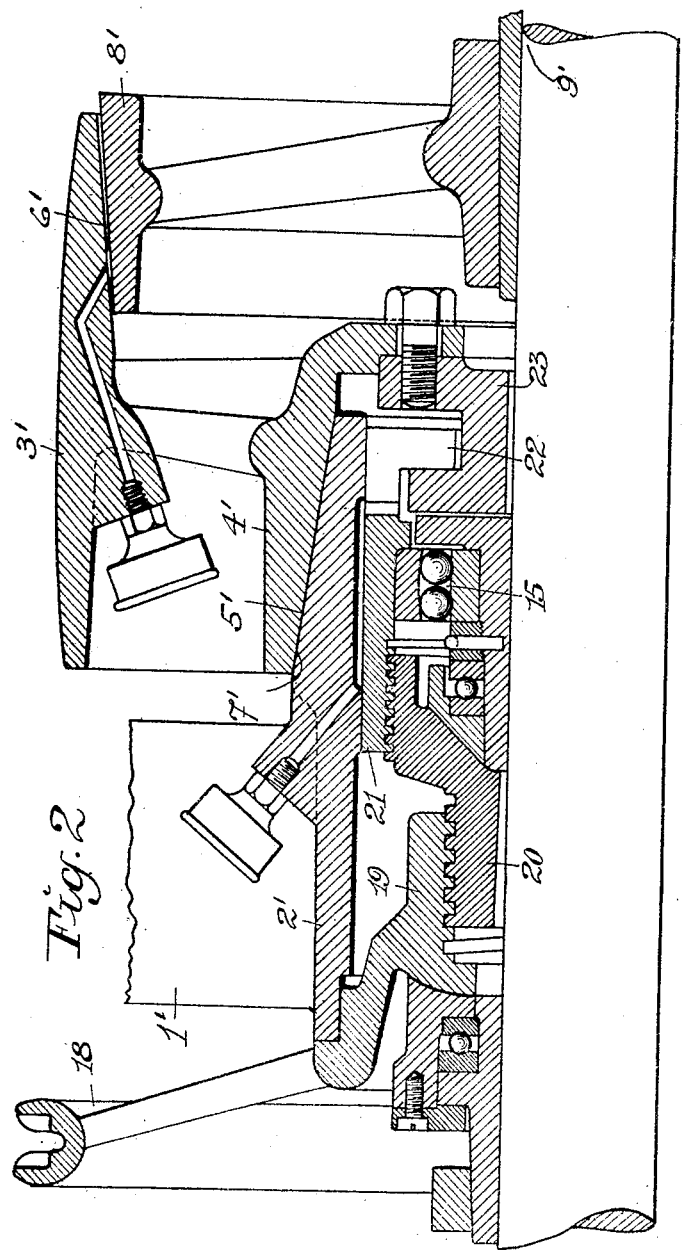

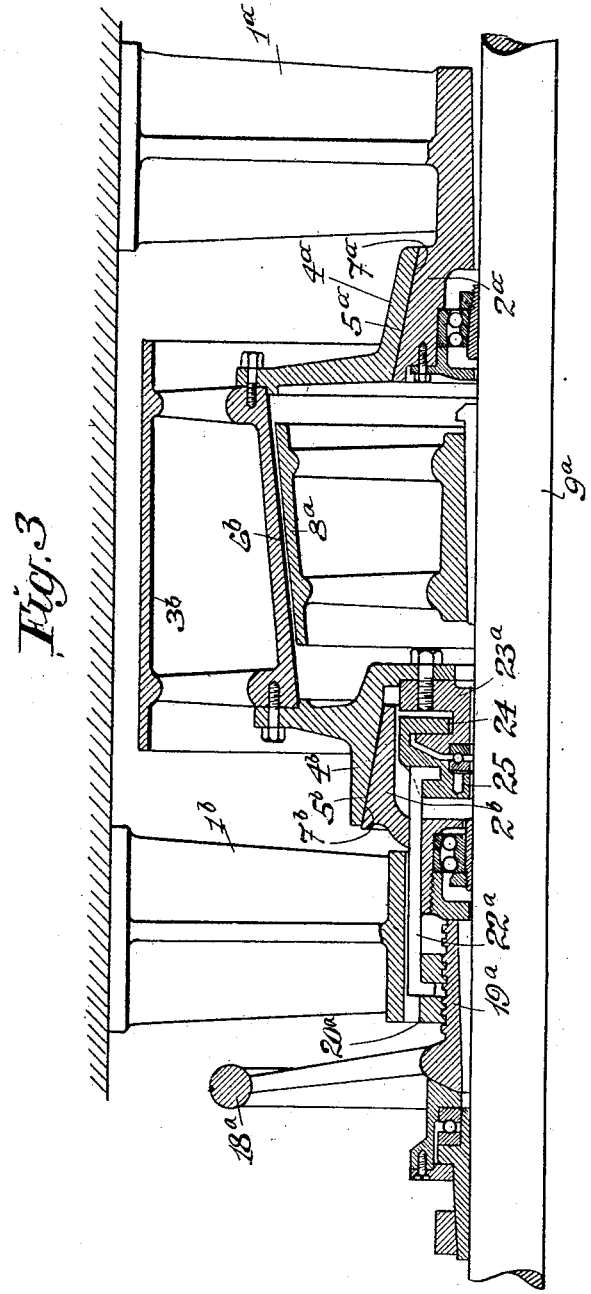

UNITED STATES PATENT OFFICE.

KLAS HERMAN JOHANSSON, OF NÄSSJÖ, SWEDEN, ASSIGNOR TO AKTIEBOLAGET LINDENS HEMMASKINER, OF NÄSSJÖ, SWEDEN.

COMBINED BEARING AND COUPLING DEVICE FOR POWER-TRANSMITTING DEVICES.

1,368,034.

Specification of Letters Patent.

Patented Feb. 8, 1921.

Application filed February 16, 1918. Serial No. 217,629.

*To all whom it may concern:*

Be it known that I, KLAS HERMAN JOHANSSON, a subject of the King of Sweden, and residing at Nässjö, in the Kingdom of Sweden, have invented certain new and useful Improvements in Combined Bearing and Coupling Devices for Power-Transmitting Devices, of which the following is a specification.

My present invention relates to improvements in combined bearing and coupling devices of the type described in the U. S. A. Patent No. 1,205,544 and has for its object to obtain a more practical, simple and cheap device of said type.

According to the said patent the coupling device comprises two conical parts provided on a shaft and adapted to coöperate with the hub of a pulley, one of said parts being fixed on said shaft and the other slidable on the same. The pulley may be connected with or disconnected from the shaft by displacing the slidable part in one or the other direction.

My present improvement differs from the above described coupling device thereby that instead of using both fixed and slidable coupling members on the shaft, there is only a fixed coupling member provided on the same and having a clutch face and that the pulley itself is adapted to be displaced in the longitudinal direction of the shaft, so that the same, on being displaced in one direction or the other, is brought into engagement either with the clutch face of the fixed coupling member on the shaft, or with the brake face of a stationary coupling member formed by or connected with the stationary bearing block. Instead of one stationary coupling member there may also be two or several such members provided that there are two or several bearing blocks and two or several corresponding coupling members on the pulley or on the bushings of the same.

According to my present invention it is also rendered possible to use, instead of a sleeve which is in screw threaded engagement with the block, an ordinary actuating lever or the like for bringing the pulley into engagement with either of the coupling members, such an arrangement being principally adapted for smaller clutches. In connection with larger clutches it is suitable to use for said purpose a sleeve which is in threaded engagement with the pulley or with parts connected with the same.

Some practical forms of the invention are illustrated on the accompanying drawings, where Figure 1 shows a first form of construction in elevation and partially in section. Fig. 2 shows in vertical section a second form where the displacement of the pulley is executed by means of a hand wheel. Fig. 3 shows in vertical section a third form which is adapted for broad and heavy pulleys and where there are two bearing blocks each of them being provided with a coupling member supporting the pulley when the latter has been thrown out of engagement with the shaft.

Referring to Fig. 1, 1 is the stationary bearing block supporting the stationary coupling sleeve 2. The pulley which is displaceable in the longitudinal direction of the shaft is designated by 3 and its grooved hub by 4. On this pulley there are two conical coupling surfaces 5 and 6, the first mentioned coupling surface or brake face 5 being adapted to be connected with a corresponding coupling surface or brake face 7 provided in the coupling member 2, while the other clutch face 6 is adapted to be connected with the clutch face of coupling device 8 fixed on the shaft 9.

Two sleeves 13 and 14 surround the shaft 9. One end of the sleeve 13 is exteriorly threaded and is secured into the interiorly threaded adjacent end of the sleeve 14 to clamp the outer race ring 15'' there-between. The inner ring 15' of the ball bearing 15 is clamped against a shoulder on a sleeve 14'' also arranged about the shaft 9, the balls 15''' being arranged between the two race rings as indicated in Fig. 1. The sleeve 14 is provided with a claw 14' arranged within the grooved hub 4 of the pulley 3. A forked lever 12 has its arms arranged within a groove in the sleeve 13 and is pivoted at 11 to an arm 10 or other stationary support fixed on the bearing block so that upon swinging of the lever in either direction the sleeves 13 and 14 will be moved correspondingly because of the threaded connection there-between and by reason of the arrangement of the claw 14' in the grooved hub 4 of the pulley 3 the latter will be moved correspondingly. For instance when moved to the left the clutch face 6 of the pulley will be disconnected from the coupling device 8 while the brake face 5 will engage the brake face 7 on the coupling member 2 in order that the pulley 3 may be supported by the bearing block and upon movement of the lever in the opposite direction the faces 5 and 7 will be disengaged and the clutch face 6 will engage the coupling device 8 so that the pulley will be brought to rotate with the shaft. It is to be understood that the claw 14' engages the outer portion of the grooved hub 4 to effect the first mentioned sliding and on a reverse movement of the lever abuts the opposite wall of the groove to effect the second mentioned sliding.

In order to prevent any unintentional connecting or disconnecting of the clutch the lever 12 is by means of a spring, rod or the like 16 connected with the bearing block, a link 17 being pivotally connected with the opposite end of the spring 16 and with the lever. On turning the lever, a certain pressure is required for displacing the link from or toward the bearing block, and the spring 16 and link 17 thus act as a means tending to hold the lever 12 in the desired position.

In the form of construction shown in Fig. 2 corresponding parts are designated and act in the same manner as described in connection with Fig. 1, wherefore a further description of the same is here superfluous. This form of construction differs from that shown in Fig. 1 principally by the friction surface 7' being located externally on the stationary coupling member and the coupling surface 5' internally in the bushing 4', and that another device is used for connecting or disconnecting the clutch. The said device here consists of a rope pulley or chain wheel which by a rope or chain can be acted upon by the operator of the machine tool if the clutch is located at a high level. The bushing 19 of the rope or chain wheel 18 is in threaded engagement with a sleeve 20 located around the shaft 9'. On the sleeve 20 is threaded another sleeve 21 which by claws 22, a flange or other connecting device is connected with the hub 23 of the pulley. By turning the wheel 18 in one or the other direction the pulley is displaced along the shaft and brought into engagement either with the coupling member 8' on the shaft or with the stationary coupling member 2' on the bearing block.

In the form of construction shown in Fig. 3 the corresponding parts are designated in the same manner as in the previous figures. In this form there are two bearing blocks 1$^b$ and 1$^a$ and two coupling members 2$^b$ and 2$^a$ supported by the same, the friction surfaces 7$^b$ and 7$^a$ being located externally on the same. The pulley 3$^a$ which is here assumed to be larger and broader than in the previous figures is provided with two bushings 4$^b$ and 4$^a$ with internal friction surfaces 5$^b$ and 5$^a$ respectively. The coupling member 8$^a$ fixed on the shaft 9$^a$ can be connected with a corresponding coupling member 6$^a$ on the pulley. The device for connecting and disconnecting the clutch is here nearly the same as in Fig. 2. The claws 22$^a$ here catch in a sleeve 24 which is connected with the hub 23$^a$ of the pulley. The springs 25 are adapted to hold the parts of the ball bearing tightly together in spite of the play which may exist between the sleeve 24 and the hub 23$^a$.

It is evident that the details of the invention can be varied without departing from the scope of the invention.

Having now described my invention, what I claim as new and desire to secure by Letters Patent is:

1. In a combined bearing and coupling device for belt pulleys, the combination of a stationary bearing block, a rotary shaft passing through said block, a coupling member fixed on the shaft and provided with a clutch face, a stationary coupling member on the bearing block and provided with a brake face, a belt pulley having a grooved hub loosely mounted on the shaft and located between the coupling member and the block and provided with clutch and brake faces, a shiftable sleeve about the shaft and provided with a claw arranged in the grooved hub of the pulley, and manually operable mechanism for shifting the sleeve so that the clutch face of the pulley will be engaged with the clutch face of the coupling member on the shaft or so that the brake face of the pulley will be engaged with the brake face of the coupling member on the bearing block.

2. In a combined bearing and coupling device for power transmitting devices, the combination of two stationary bearing blocks, a stationary coupling member on each bearing block, a shaft passing through said blocks, a belt pulley located between the bearing blocks and adapted to be displaced in the longitudinal direction of the shaft, a coupling member fixed on the shaft and adapted to coöperate with a coupling member provided on the pulley, coupling members on the pulley adapted to coöperate with the stationary coupling members on the bearing blocks and means for displacing the pulley so as to connect it either with the coupling device on the shaft so as to rotate with the latter, or with the stationary coupling members on the bearing blocks for being supported by said blocks, substantially as described and for the purpose set forth.

In testimony whereof I have affixed my signature in presence of two witnesses.

KLAS HERMAN JOHANSSON.

Witnesses:
 AXEL EHRNER,
 JACOB BAGGS.